UNITED STATES PATENT OFFICE.

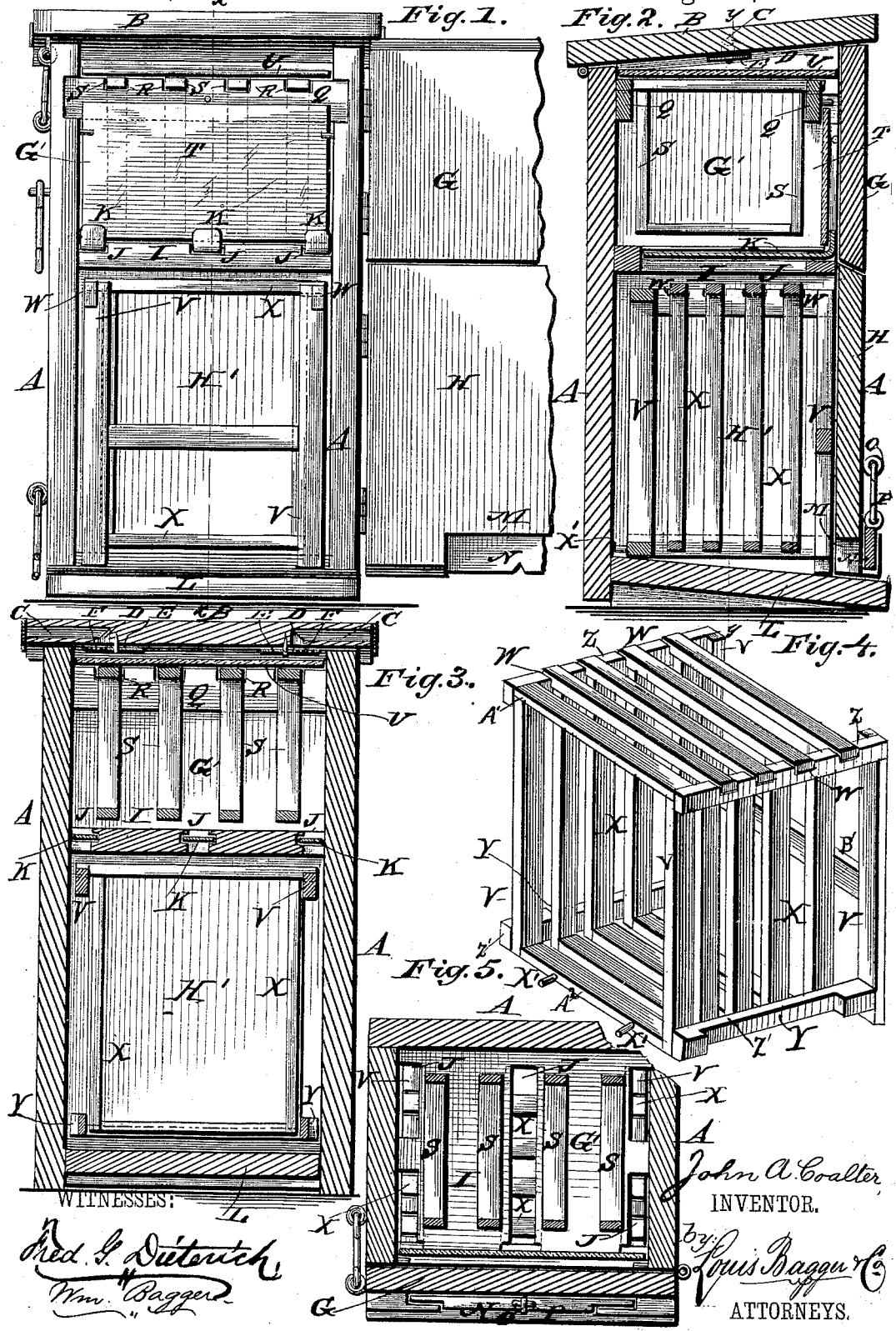

JOHN ABSOLEM COALTER, OF WOLF CREEK, WEST VIRGINIA.

BEE-HIVE.

SPECIFICATION forming part of Letters Patent No. 324,657, dated August 18, 1885.

Application filed December 10, 1884. (No model.)

*To all whom it may concern:*

Be it known that I, JOHN A. COALTER, a citizen of the United States, and a resident of Wolf Creek, in the county of Monroe and State of West Virginia, have invented certain new and useful Improvements in Bee-Hives; and I do hereby declare that the following is a full, clear, and exact description of the invention, which will enable others skilled in the art to which it appertains to make and use the same, reference being had to the accompanying drawings, which form a part of this specification, and in which—

Figure 1 is a front view of my improved bee-hive with the doors of the same open. Fig. 2 is a vertical sectional view of the same, taken on the line $x$ $x$ in Fig. 1. Fig. 3 is a vertical transverse sectional view taken on the line $y$ $y$ in Fig. 2. Fig. 4 is a detail view in perspective of the lower detachable main frame, with the brood-frames supported therein; and Fig. 5 is a horizontal transverse sectional view taken through the upper portion of the hive.

The same letters refer to the same parts in all the figures.

This invention relates to bee-hives; and it has for its object to provide a device of this class which shall possess superior advantages in point of simplicity, durability, inexpensiveness, adaptability, and general efficiency.

With these ends in view the invention consists in the improved construction and arrangement of parts which will be hereinafter fully described, and particularly pointed out in the claim.

In the drawings hereto annexed, A designates the hive-box, which may be of any suitable dimensions, and preferably proportioned substantially as in the drawings hereto annexed, by reference to which it will be seen that its height is about twice the width and depth. The top of the hive-box slants downward toward the rear edge, and is provided at the said rear edge with a hinged cover, B. The latter is provided with channels or passages C C, extending inward from its edges, and from the inner ends of which openings D extend downward through the inside of the cover, which is provided with pivoted plates E E, having at one end perforations F, which may be turned under the said openings, so as to provide for proper ventilation without danger of wind or water entering the hive through said ventilating-openings.

The front side of the hive is provided with doors G and H, hinged to one of the sides and corresponding with compartments G' and H', formed by a transverse horizontal partition-board, I. The latter is provided with a series of longitudinal slots or openings, J J, two of which are adjoining the sides or edges of the hive, and all of which are provided with slides K, by means of which they may be closed when required. The lower edge of the upper door, G, overlaps the upper edge of the lower door, H, so as to form a close and tight joint, through which no moisture will be admitted into the hive. The doors G and H are made fast when closed by means of suitable hooks and eyes, as is the top cover, B.

The bottom L of the hive is placed in a slanting position toward the front, for the double purpose of preventing any water which should find access to the hive in any manner from remaining in the hive, and of enabling the bees to rid the hive of dead bees or any other impurities.

The lower edge of the door H is provided with the bee-entrance M, over which is fitted a slide, N, by means of which it may be closed, when desired; or the said slide may be retained in a raised or open position, when desired, by means of a suitable hook, O, engaging an eye or staple, P, in the upper edge of the said slide.

The upper compartment, G', of the hive is provided at its upper front and rear edges with transverse slats Q Q, having notches or gains R R, in which are supported the honey-frames S S. The front of this compartment is covered by a permanent glass, T, and another glass, U, rests removably on top of the honey-frames, in order to enable the working of the colony to be conveniently inspected, and at the same time afford access to the honey-frames, which may be readily removed when the slots in the transverse partition are closed.

In the lower compartment, H', of the hive is a removable frame consisting of four upright posts, V, the front ones of which are longer than the rear ones, so that the frame will stand upright upon the slanting bottom L. These posts V are connected together by the side pieces, Z and Z', rear cross-pieces. A' and A², and the front cross-piece, B'. The top side pieces, Z, are provided with notches W, in which the brood-frames X X are supported. The bottom side pieces, Z', are provided with gains Y, through which the bees can pass between the frame and the sides of the hive, and the rear bottom cross-piece, A², is provided with rearwardly-projecting pins X' X', which prevent the frame from being pushed against the back of the hive.

From the foregoing description, taken in connection with the drawings hereto annexed, the operation and advantages of this invention will be readily understood by skilled apiarists.

The general construction of the hive is simple, inexpensive, and convenient. Access to the colony and to the honey-boxes may be readily had. A feeding-box of suitable construction may be readily arranged in position in the upper portion of the hive in place of the central honey-frames, and easily accessible to the bees through the central slot in the transverse partition, and many other uses and advantages will readily suggest themselves to those skilled in the management of bees.

Having thus fully described my invention, I claim and desire to secure by Letters Patent of the United States—

The combination, with a bee-hive having an inclined bottom, of a removable supporting-frame consisting of four upright posts, the front ones being longer than the rear ones, said four posts being joined together by top and bottom side pieces, top and bottom rear cross-pieces, and a front cross-piece, said top side pieces being provided with notches, and the said bottom side pieces being provided with gains, and the rear bottom piece being provided with rearwardly-projecting pins, and a number of brood-frames supported within said frame, substantially as and for the purpose described.

In testimony that I claim the foregoing as my own I have hereunto affixed my signature in presence of two witnesses.

JOHN ABSOLEM COALTER.

Witnesses:
L. T. D. FAULCONER,
C. M. G. AYERS.